(12) United States Patent
McPhee et al.

(10) Patent No.: US 6,629,782 B2
(45) Date of Patent: Oct. 7, 2003

(54) TUNED FIBER OPTIC CONNECTOR AND METHOD

(75) Inventors: Robert J. McPhee, Chaska, MN (US); Ronald J. Drechnik, Roseville, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 10/067,134

(22) Filed: Feb. 4, 2002

(65) Prior Publication Data

US 2003/0147598 A1 Aug. 7, 2003

(51) Int. Cl.[7] ............................................... G02B 6/36
(52) U.S. Cl. ............................ 385/78; 385/76; 385/77; 385/81
(58) Field of Search ............................. 385/76, 77, 78, 385/81, 84, 60, 62

(56) References Cited

U.S. PATENT DOCUMENTS

| | | | |
|---|---|---|---|
| 4,679,895 A | 7/1987 | Huber ..................... 350/96.2 |
| 4,690,494 A | 9/1987 | Hirose et al. ............. 350/96.2 |
| 4,762,389 A | 8/1988 | Kaihara ................... 350/96.21 |
| 5,016,970 A | 5/1991 | Nagase et al. ........... 350/96.21 |
| 5,134,677 A | 7/1992 | Leung et al. .................. 385/84 |
| 5,142,598 A | 8/1992 | Tabone ......................... 385/78 |
| 5,146,525 A | 9/1992 | Tabone ......................... 385/78 |
| 5,181,267 A | 1/1993 | Gerace et al. ................. 385/86 |
| 5,212,752 A | 5/1993 | Stephenson et al. .......... 385/78 |
| 5,214,732 A | 5/1993 | Beard et al. .................. 385/78 |
| 5,216,733 A | 6/1993 | Nagase et al. ................. 385/60 |
| 5,222,169 A | 6/1993 | Chang et al. ................. 385/87 |
| 5,224,186 A | 6/1993 | Kishimoto et al. ........... 385/78 |
| 5,253,315 A | 10/1993 | Fentress ....................... 385/78 |
| 5,287,425 A | 2/1994 | Chang ......................... 385/81 |
| 5,317,663 A | 5/1994 | Beard et al. .................. 385/70 |
| 5,321,784 A | 6/1994 | Cubukciyan et al. ......... 385/78 |
| 5,428,703 A | 6/1995 | Lee ............................. 385/78 |
| 5,436,995 A | 7/1995 | Yoshizawa et al. ........... 385/86 |
| 5,625,731 A | 4/1997 | Turgeon et al. ............... 385/53 |
| 5,633,970 A | 5/1997 | Olson et al. .................. 385/78 |
| 5,671,310 A | 9/1997 | Lin et al. ...................... 385/78 |
| 5,682,451 A | 10/1997 | Lee et al. ...................... 385/78 |
| 5,717,802 A | 2/1998 | Briggs et al. ................. 385/75 |
| 5,732,175 A | 3/1998 | Fan ............................. 385/87 |
| 5,809,192 A | 9/1998 | Manning et al. .............. 385/78 |
| 5,946,436 A | 8/1999 | Takashi ........................ 385/60 |
| 6,142,676 A | 11/2000 | Lu ............................... 385/60 |
| 6,155,146 A | * 12/2000 | Andrews et al. .............. 81/461 |
| RE37,079 E | 3/2001 | Stephenson et al. .......... 385/78 |
| RE37,080 E | 3/2001 | Stephenson et al. .......... 385/78 |
| 6,419,402 B1 | 7/2002 | Zimmel ........................ 385/86 |

FOREIGN PATENT DOCUMENTS

| | | |
|---|---|---|
| EP | 1 072 914 A2 | 1/2001 |
| EP | 1 072 915 A2 | 1/2001 |

\* cited by examiner

*Primary Examiner*—Javaid H. Nasri
(74) *Attorney, Agent, or Firm*—Merchant & Gould, P.C.

(57) ABSTRACT

A tunable fiber optic connector and method for assembling a tunable connector. The connector may include a ferrule mounted to an optical fiber and a hub. A front housing of the connector includes a bore for receiving a rear housing, an anti-rotation seat configured to engage the hub, and a cavity coupled to the anti-rotation seat. A length of an elongated cylindrical rear portion of the hub is sized so that the anti-rotation portion of the hub can be pushed completely into the cavity and rotated to tune the connector when the rear housing is partially inserted into the front housing, and an end of the elongated cylindrical rear portion of the hub abuts the rear housing so that the anti-rotation portion of the hub cannot be completely pushed back into the cavity and rotated when the rear housing is completely engaged with the front housing.

14 Claims, 6 Drawing Sheets

TUNED FIBER OPTIC CONNECTOR AND METHOD

TECHNICAL FIELD

The present invention relates to tunable fiber optic connectors for use in an optical fiber signal transmission system, and to methods for assembling such fiber optic connectors.

BACKGROUND

Fiber optic cables are used in the telecommunication industry to transmit light signals in high-speed data and communication systems. A standard fiber optic cable includes a fiber with an inner light transmitting optical core. Surrounding the fiber is an outer protective casing.

A fiber terminates at a fiber optic connector. Connectors are frequently used to non-permanently connect and disconnect optical elements in a fiber optic transmission system. There are many different fiber optic connector types. Some of the more common connectors are FC and SC connectors. Other types of connectors include ST and D4-type connectors.

A typical SC fiber optic connector includes a housing having a front end positioned opposite from a rear end. The front end of the SC connector housing is commonly configured to be inserted within an adapter. An example adapter is shown in U.S. Pat. No. 5,317,663, assigned to ADC Telecommunications, Inc. The SC connector typically further includes a ferrule that is positioned within the front and rear ends of the housing, and adjacent the front end. The ferrule is axially moveable relative to the housing, and is spring biased toward the front of the connector. The fiber optic cable has an end that is stripped. The stripped end includes a bare fiber that extends into the connector and through the ferrule.

A connector, such as the connector described above, is mated to another connector within an adapter like the adapter of U.S. Pat. No. 5,317,663. A first connector is received within the front portion of the adapter, and a second fiber is received within the rear portion of the adapter. When two connectors are fully received within an adapter, the ferrules (and hence the fibers internal to the ferrule) contact or are in close proximity to each other to provide for signal transmission between the fibers. Another connector and mating adapter is shown in U.S. Pat. No. 6,142,676, assigned to ADC Telecommunications, Inc.

Signal losses within a system often occur within the connection between two optical fiber cores. Due to manufacturing tolerances of the ferrule outer diameter to inner diameter concentricity, ferrule inner diameter hole size and fiber outer diameter, and fiber core to fiber outer diameter concentricity, when the fiber is inserted into the ferrule the core of a fiber may not and typically does not end up perfectly centered relative to the ferrule outer diameter. If one or both of the fibers are off center, when they are connected within an adapter, the fibers will not be aligned and thus there will be a signal loss when the signal is transmitted between the two fibers. It is therefore desirable to tune a connector to minimize this signal loss. Tuning can be accomplished by measuring signal characteristics through the connector and/or examining physical properties of the connector, and then determining the optimal position of the ferrule and fiber in the connector.

SUMMARY

The present invention concerns tunable fiber optic connectors including a spring biased ferrule and hub assembly within the connector. Tuning can be accomplished by partially assembling the connector and pressing the ferrule back into the connector so that an anti-rotation portion of the hub clears an anti-rotation seat of the connector. In this position, the ferrule can be rotated about a connector axis to the desired rotational alignment that minimizes signal loss. The ferrule can then be released, allowing the anti-rotation portion of the hub to re-engage the anti-rotation seat, thereby preventing further rotation that may cause the connector to become un-tuned. The connector is then fully assembled so that the ferrule cannot be inadvertently pushed back into the connector and turned. In addition, stresses placed on the cable and optic fiber cannot cause the attached hub and ferrule to be pulled back into the connector and turned to become un-tuned through rotation of the ferrule. The pulling stresses are especially problematic for small connectors, such as 0.900-millimeter connectors, wherein the cable is without reinforcing strength members.

One aspect of the invention relates to a fiber optic connector including an optical fiber, a ferrule mounted to the optical fiber, a hub retainably engaging the ferrule, wherein the hub includes an elongated rear portion coupled to an anti-rotation portion, a rear housing having an external surface and a bore for receiving the optical fiber, a front housing having an internal surface for receiving and engaging the external surface of the rear housing, having an anti-rotation seat configured to engage the anti-rotation portion of the hub, and defining a cavity coupled to the anti-rotation seat; and a spring captured between the anti-rotation portion of the hub and the rear housing to bias the anti-rotation portion of the hub into the anti-rotation seat of the front housing. A length of the elongated rear portion of the hub is sized so that: (1) the anti-rotation portion of the hub can be pushed completely into the cavity and rotated to tune the connector when the rear housing is partially inserted into the front housing; and (2) an end of the elongated rear portion of the hub abuts the rear housing so that the anti-rotation portion of the hub cannot be completely pushed back into the cavity and rotated when the rear housing is completely engaged with the front housing.

Another aspect of the invention relates to a fiber optic connector comprising a ferrule and hub assembly including an inner bore defining a connector axis and sized for receipt of an optical fiber, a front end defining an end face, an opposite rear end, and an anti-rotation portion disposed between the front and rear ends, a front housing having an anti-rotation seat engageable with the anti-rotation portion of the ferrule and hub assembly in a plurality of positions about the connector axis, a rear housing mountable to the front housing in a first, partially assembled position and a second, fully assembled position, the partially assembled and fully assembled positions defining different relative positions along the connector axis, the front and rear housings defining a chamber for receipt of the ferrule and hub assembly, and a spring within the chamber for biasing the ferrule and hub assembly away from the rear housing. The ferrule and hub assembly is moveable within the chamber along the connector axis against the spring bias when the front and rear housings are in the partially assembled position so that the anti-rotation seat is disengaged from the anti-rotation portion, wherein the ferrule and hub assembly can be rotated about the connector axis relative to the front and rear housings, and the ferrule and hub assembly, when the front and rear housings are in the fully assembled position, engages the rear housing when moved within the chamber along the connector axis, thereby preventing the anti-rotation seat from disengaging from the anti-rotation portion.

Yet another aspect of the invention relates to a fiber optic connector including an optical fiber, a ferrule mounted to the optical fiber, a hub retainably engaging the ferrule, wherein the hub includes an cylindrical rear portion coupled to an anti-rotation portion, a rear housing having an engagement surface and a bore for receiving the optical fiber, a front housing having an engagement surface for receiving and engaging the engagement surface of the rear housing and having an anti-rotation seat configured to engage the anti-rotation portion of the hub; and a spring captured between the anti-rotation portion of the hub and the rear housing to bias the anti-rotation portion of the hub into the anti-rotation seat of the front housing. The front and rear housings together define a cavity having a longitudinal length extending along a connector axis so that: (1) when the rear housing is partially inserted into the front housing, the longitudinal length of the cavity is of sufficient length to allow the anti-rotation portion of the hub to be pushed completely into the cavity and rotated to tune the connector; and (2) when the rear housing is fully inserted into the front housing, the longitudinal length of the cavity is not of sufficient length to allow the anti-rotation portion of the hub to be pushed completely into the cavity and rotated to tune the connector.

Another aspect of the invention relates to a method for tuning a fiber optic connector including steps of: providing a ferrule with a hub retainably engaging the ferrule, the hub including an anti-rotation portion; providing a front housing including a bore with an engagement surface, an anti-rotation seat, and defining a cavity; providing a rear housing including a bore with an engagement surface; inserting the bore of the rear housing partially into the bore of the front housing; pushing the hub into the cavity so that the anti-rotation portion clears the anti-rotation seat of the front housing; rotating the ferrule and the hub to tune the connector; releasing the hub so that the anti-rotation portion re-engages the anti-rotation seat of the front housing; and pushing the rear housing further into the front housing until the rear and front housing are fully engaged.

Another aspect of the invention relates to a method for tuning a fiber optic connector including steps of: providing a fiber held by a ferrule with a hub retainably engaging the ferrule, the hub extending for a length and including a rear end, the connector including front and rear housings engageable with one another, wherein a length of the hub is such that the rear end abuts the rear housing of the connector when the rear housing is fully engaged with the front housing and the ferrule and hub are pushed back towards the rear housing; inserting the rear housing partially into the front housing; pushing the ferrule back towards the rear housing; rotating the ferrule and hub to tune the connector; and pushing the rear housing further into the front housing until the rear housing completely engages the front housing and thereby prevents further rotation of the ferrule and the hub.

Yet another aspect of the invention relates to a method for tuning a fiber optic connector, the method comprising steps of: providing a fiber held by a ferrule with a hub retainably engaging the ferrule, the hub extending for a length and including a rear end, the connector including front and rear housings engageable with one another, wherein a length of the hub is such that the rear end abuts the rear housing of the connector when the rear housing is fully engaged with the front housing and the ferrule and hub are pushed back towards the rear housing; inserting the rear housing partially into the front housing; measuring alignment of the fiber in the ferrule; and pushing the rear housing further into the front housing until the rear housing completely engages the front housing and thereby prevents further rotation of the ferrule and the hub.

DETAILED DESCRIPTION OF THE PREFERRED EMBODIMENT

Reference will now be made in detail to exemplary aspects of the present invention that are illustrated in the accompanying drawings. Wherever possible, the same reference numbers will be used throughout the drawings to refer to the same or like parts.

Figure 1:
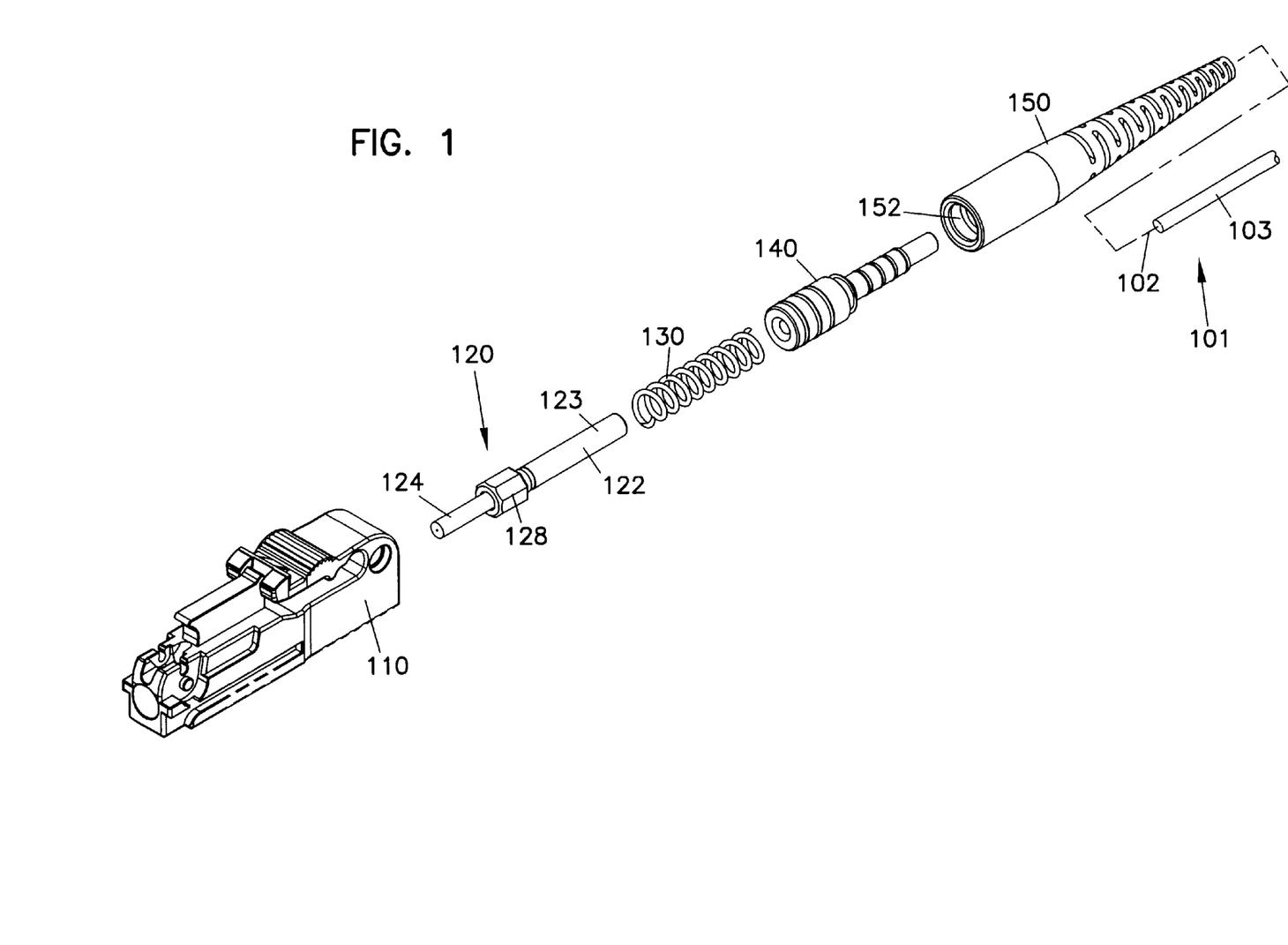
FIG. 1 is an exploded view of an example embodiment of a fiber optic connector made in accordance with the present invention.

FIG. 1 is an exploded view of an example connector 100 illustrating components made in accordance with the present invention. The connector 100 includes a front housing 110, a rear housing 140, and a boot 150 with a bore 152. Also included is a hub/ferrule assembly 120 with a hub 122 and a ferrule 124. The hub 122 includes an anti-rotation portion 128 and an elongated cylindrical rear portion 123. The hub 122 is connected to the ferrule 124, such as with adhesive or with an interference fit. A spring 130 is also provided. A fiber optic cable 101 is shown including a fiber 102 and a jacket 103. The cable 101 is of the type without reinforcing strength members.

Figure 2:
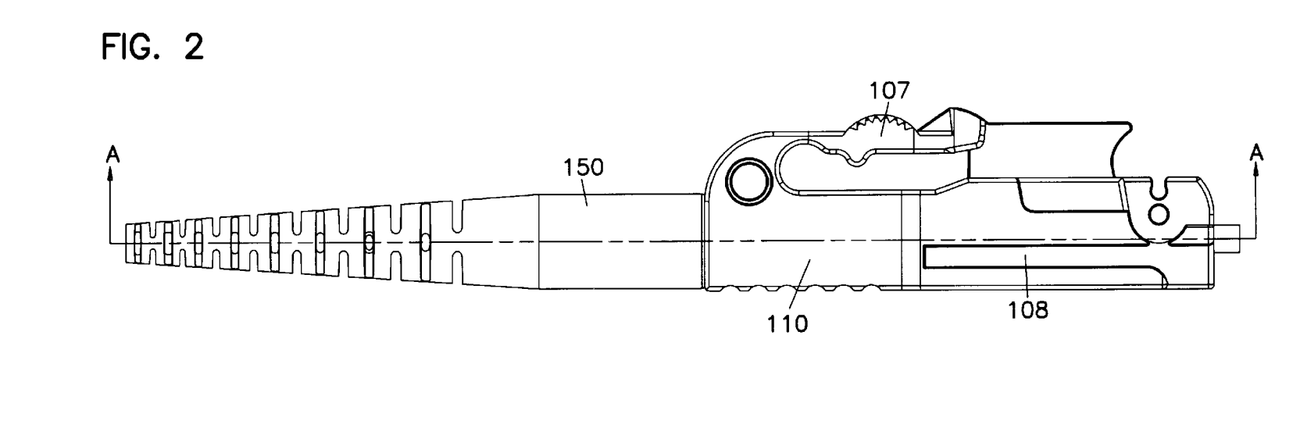
FIG. 2 is a side view of the connector of FIG. 1 in a fully assembled state with the front cover removed.
Figure 3:
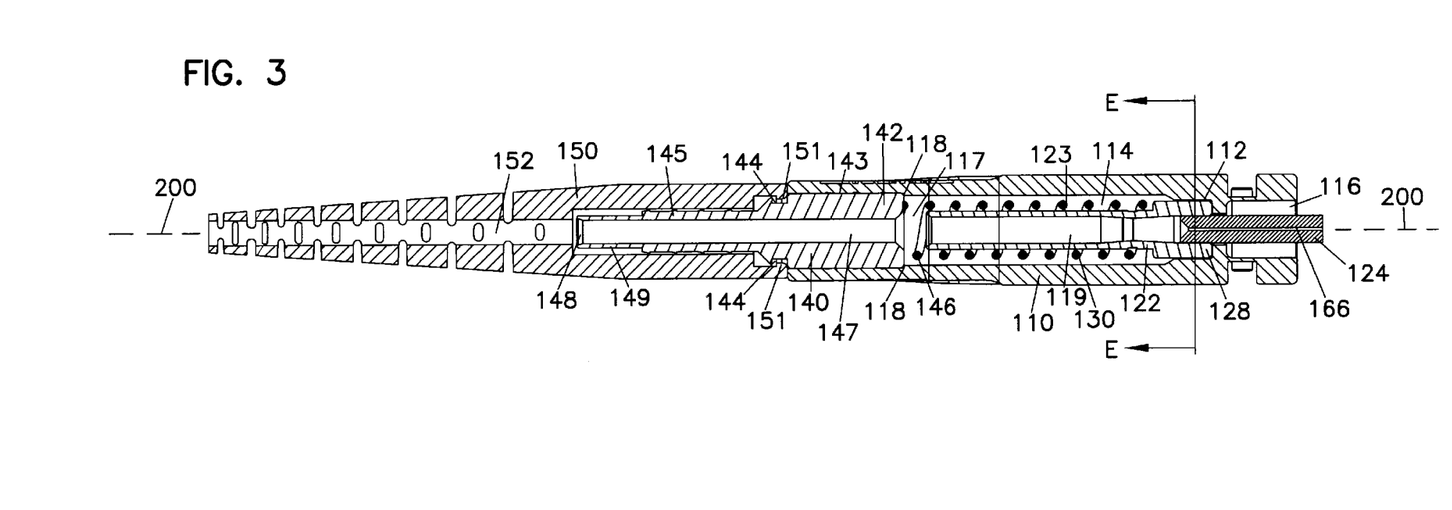
FIG. 3 is a cross-sectional view taken along line A—A of the connector shown in FIG. 2.
Figure 10:
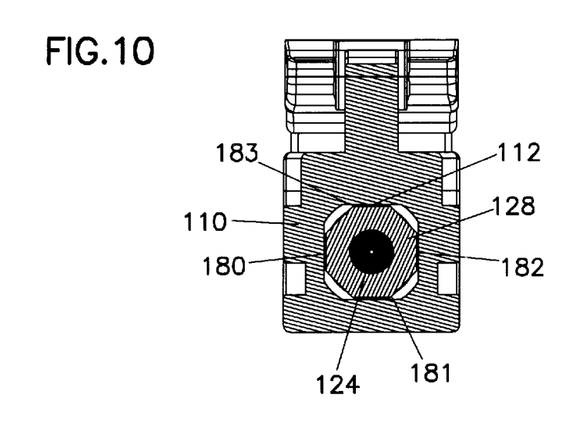
FIG. 10 is a cross-sectional view taken along line E—E of the connector shown in FIG. 3.

Referring to FIGS. 2 and 3, the connector 100 is shown in a fully assembled state. The front housing 110 of the connector 100 extends along a longitudinal axis 200 and defines an anti-rotation seat 112 and a cavity 114. The ferrule 124 extends through a front bore 116 of the front housing 110 and includes a passage 166. The anti-rotation portion 128 of the hub 122 is slidingly engaged along the longitudinal axis 200 in the anti-rotation seat 112. In the example embodiment, the anti-rotation portion 128 is shaped in an octagonal configuration (see FIG. 10) and the anti-rotation seat 112 defines a seat of a complementary geometry. Four planar sides 180, 181, 182, and 183 form the seat 112 (see FIG. 10). The anti-rotation portion 128 and the anti-rotation seat 112 allow for sliding along the longitudinal axis 200, but prevent relative rotation. Other mating shapes and configurations are also possible. The elongated cylindrical rear portion 123 of the hub 122 extends into the cavity 114 of the front housing 110. The hub 122 includes a passage 119 extending along the longitudinal axis 200.

The spring 130 surrounds the elongated cylindrical rear portion 123 of the hub 122. The spring 130 is captured between the anti-rotation portion 128 and a surface 146 of the rear housing 140. The spring 130 functions to bias the anti-rotation portion 128 of the hub 122 into the anti-rotation seat 112 of the front housing 110. Because the ferrule 124 is connected to the hub 122, the spring 130 also functions to bias the ferrule 124 in a forward direction through the front bore 116.

An outer surface 143 of the rear housing 140 is held engagingly in a rear bore 117 of the front housing 110. In the fully engaged position as shown, the rear housing 140 is seated against notches 118 positioned in the rear bore 117. The rear housing 140 includes a passage 147. A rear portion 145 of the rear housing 140 extends along the longitudinal axis 200 into the bore 152 of the boot 150. Arms 151 of the boot 150 extend over tabs 144 formed by the rear portion 145 to hold the rear housing 140 to the boot 150. A passage 152 extending through the boot 150 is coaxially aligned with passage 147 of the rear housing 140 and passage 119 of the hub 122. The passage 119, in turn, is coaxially aligned with the passage 166 of the ferrule 124 and is sized to receive a bare fiber of a fiber optic cable. The rear housing 140 is held to front housing 110 with an interference fit.

FIGS. 2 and 3 show the final assembled positions of the front and rear housings 110 and 140. An interference fit also is present when the front and rear housings 110 and 140 are partially inserted, as will be described below. The cable 101, not shown in FIGS. 2 and 3, is extended through the passages 152 and 147, and the fiber 102 is extended through passages 119 and 166 and is glued to the ferrule 124. The jacket 103 extends through passage 119 and can abut the ferrule 124. The jacket 103 is glued to the hub 122.

Figure 11:
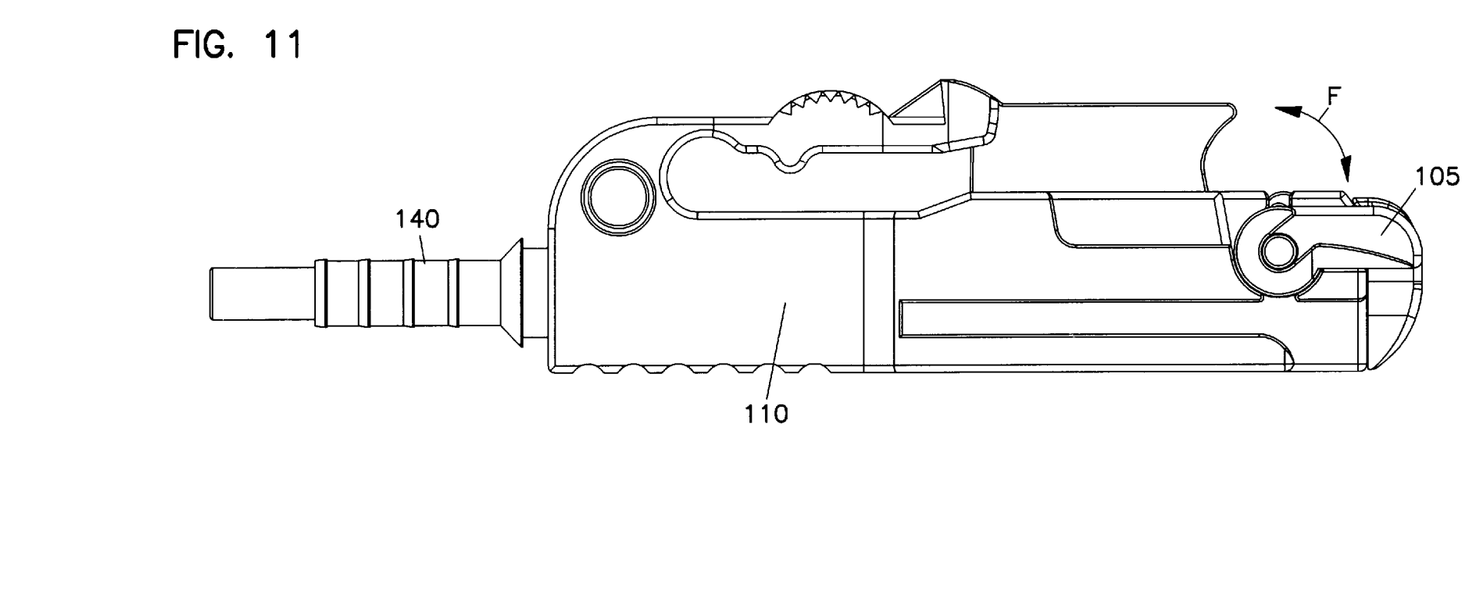
FIG. 11 is a side view of the connector with the front cover pivoted closed.

The connector 100 includes a spring-biased pivoting front cover 105 which biases the cover toward the closed position (as shown in FIG. 11) or the open position as the cover is moved in a direction F. Further details of the exterior features of the connector 100 and mating adapter are shown and described in U.S. Pat. No. 6,142,676, the disclosure of which is hereby incorporated by reference. A latch 107 latches the connector 100 to the adapter. Guides 108 engage rails on the adapter to guide the connector 100 into the adapter.

Figure 4:
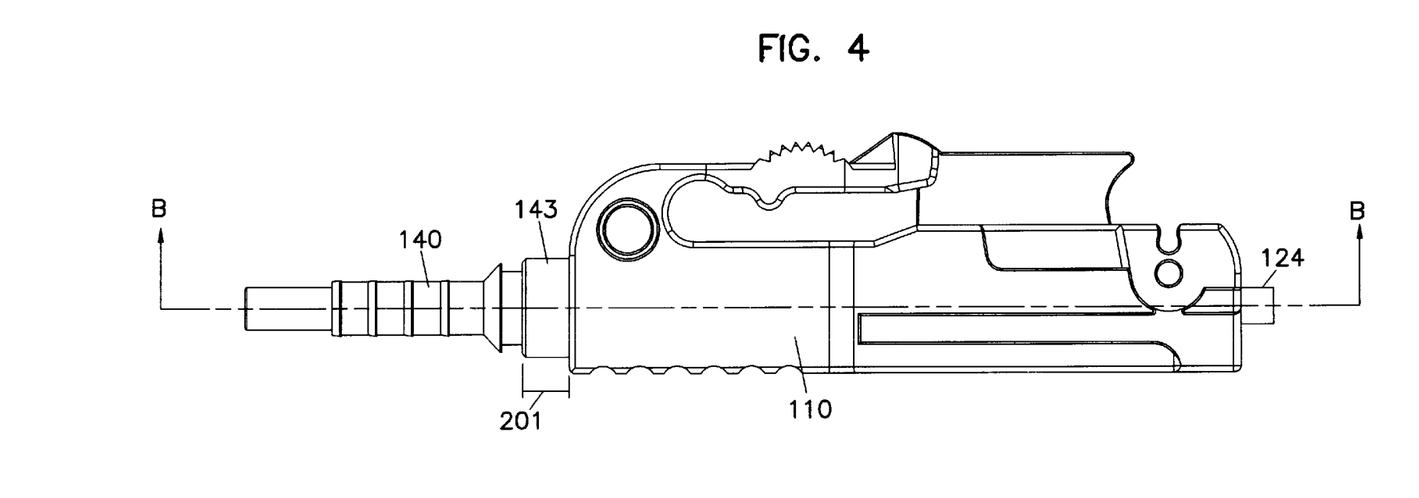
FIG. 4 is a side view of the connector of FIG. 1 in a partially assembled state.
Figure 5:
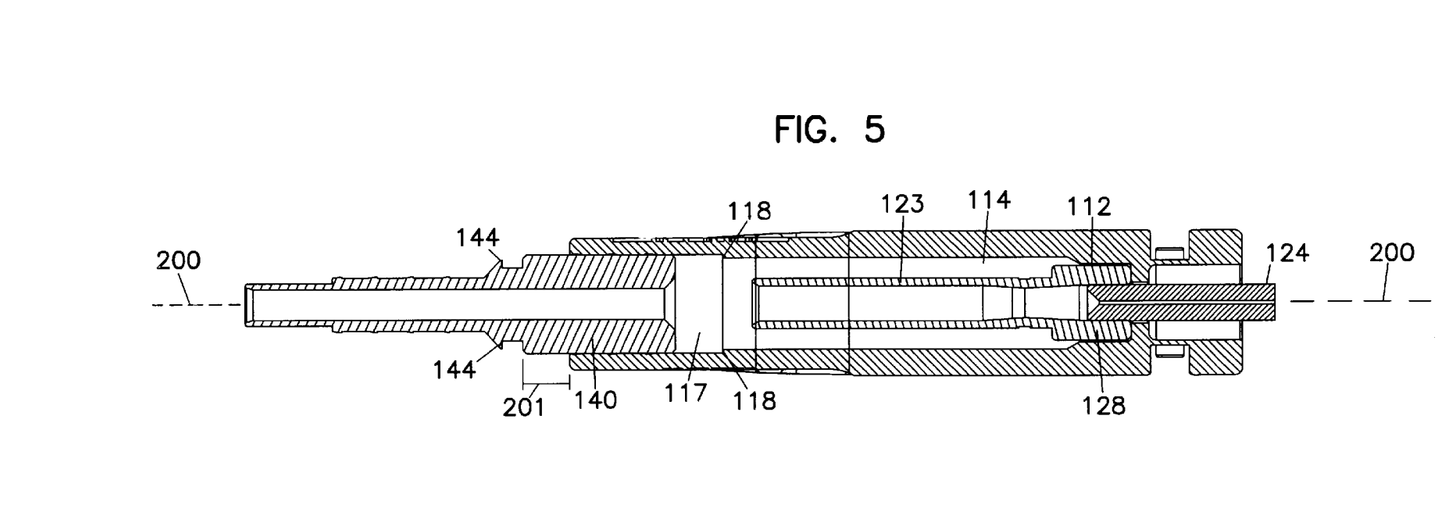
FIG. 5 is a cross-sectional view taken along line B—B of the connector shown in FIG. 4.

The connector 100 can be assembled and tuned as follows. In FIGS. 4 and 5, the hub 122 and ferrule 124 are inserted into the front housing so that the anti-rotation portion 128 of the hub 122 sits in the anti-rotation seat 112 of the front housing 110. Although the spring 130 has been removed for clarity (as well as the boot 150), it should be understood that the spring 130 surrounds the elongated cylindrical rear portion 123 of the hub 122. The rear housing 140 is then partially slid into the front housing 110 so that a portion 201 of the outer surface 143 of the rear housing 140 at least partially remains outside of the front housing 110 and the rear housing 140 remains spaced apart from the notches 118. In this configuration, the spring 130 is captured between the anti-rotation portion 128 of the hub 122 and the surface 146 of the rear housing 140, and the spring biases the anti-rotation portion 128 of the hub 122 into the anti-rotation seat of the housing 110, thereby preventing rotation of the hub 122 and the attached ferrule 124. A sufficient interference fit exists between the front and rear housings 110 and 140 so that the two parts are held together containing the spring 130, the hub 122, and the ferrule 124. The front and rear housings 110 and 140 are pressed together in any convenient manner, such as with a press or clamping tool.

Figure 6:
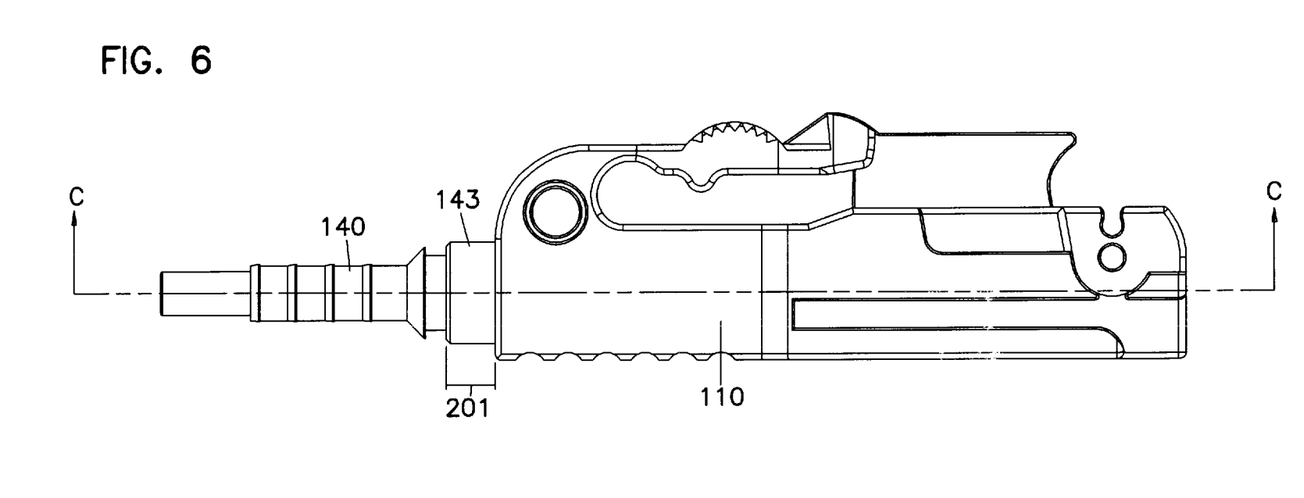
FIG. 6 is a side view of the connector of FIG. 1 in a partially assembled state with a ferrule and hub of the connector pushed towards a rear of the connector.
Figure 7:
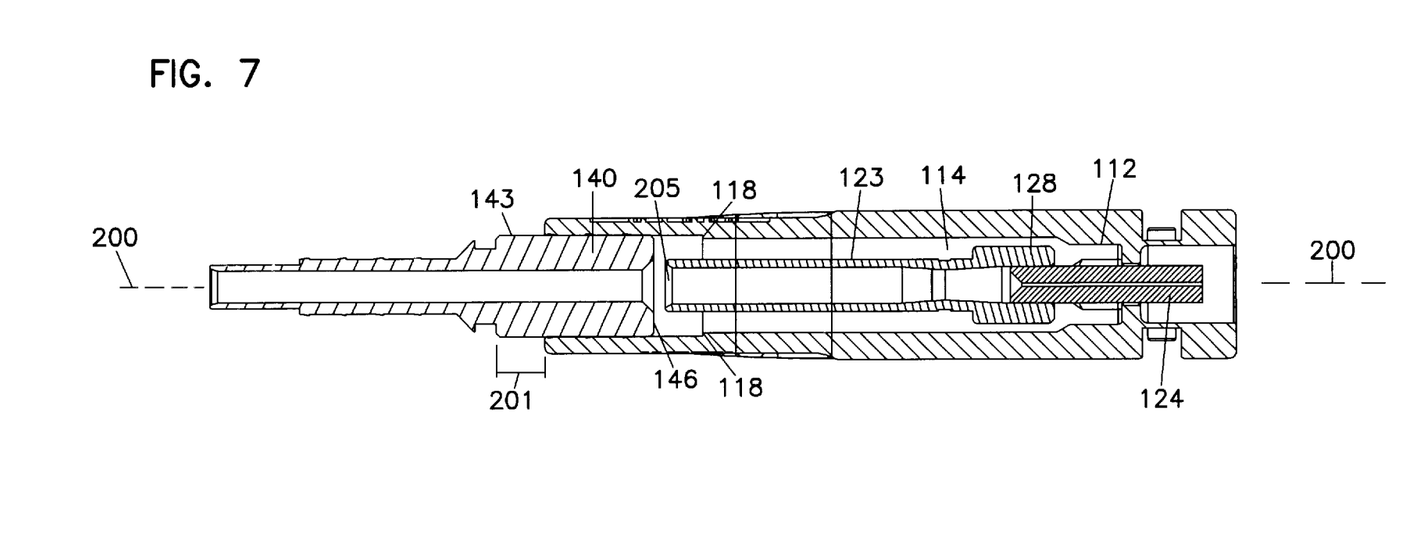
FIG. 7 is a cross-sectional view taken along line C—C of the connector shown in FIG. 6.

Referring now to FIGS. 6 and 7, with the front housing 110 and rear housing 140 in the same relative position as in FIGS. 4 and 5, the ferrule 124 and the hub 122 can be pushed back against the biasing force of the spring 130 along the longitudinal axis 200 towards the rear housing 140 so that the anti-rotation portion 128 of the hub 122 enters the cavity 114 and completely clears the anti-rotation seat 112. There is sufficient distance between the anti-rotation seat 112 and the rear surface 146 so that a rear end 205 of the elongated cylindrical rear portion 123 of the hub 122 remains spaced apart from the rear surface 146 of the rear housing 140. In this position, because the anti-rotation portion 128 of the hub 122 is no longer engaged in the anti-rotation seat 112 of the front housing 110, the ferrule 124 and the hub 122 can be rotated about the longitudinal axis 200 to tune the connector 100 as desired. Tuning can be by any method useful to determine the desired rotational position of the ferrule 124 in the connector 100. Once the ferrule 124 has been rotated to the desired rotational alignment, the ferrule 124 can be released and the spring 130 can once again bias the anti-rotation portion 128 of the hub 122 into the anti-rotation seat 112 of the front housing 110 (similar to the configuration illustrated in FIGS. 4 and 5), thereby preventing further rotation.

To complete assembly of the connector 100, the portion 201 of the outer surface 143 of the rear housing 140 is slid into the front housing 110 so that the rear housing full engages the front housing 110. In this position, the rear housing 140 is seated against notches 118 positioned in the rear bore 117. This is the configuration previously described in reference to FIGS. 2 and 3.

In the completely assembled configuration, as shown in FIGS. 2 and 3, the longitudinal distance along the longitudinal axis 200 between the anti-rotation seat 112 and the rear surface 146 of the rear housing 140 is shortened. In this state, it is no longer possible to push the ferrule 124 and the hub 122 along the longitudinal axis 200 back into the cavity 114 far enough to allow the anti-rotation portion 128 of the hub 122 to completely clear the anti-rotation seat 112 of the front housing 110. This is illustrated in the completely assembled connector 100 of FIGS. 8 and 9, wherein the ferrule 124 and the hub 122 are pushed back into the cavity 114 until the rear end 205 of the elongated cylindrical rear portion 123 of the hub 122 bottoms out against the surface 146 of the rear housing 140. The hub 122 and the ferrule 124 cannot travel any farther back along the longitudinal axis 200 once the rear end 205 engages the surface 146. In this position, the anti-rotation portion 128 of the hub 122 cannot completely clear the anti-rotation seat 112 of the front housing 110, thereby preventing rotation of the hub 122 and ferrule 124 about the longitudinal axis 200.

Figure 8:
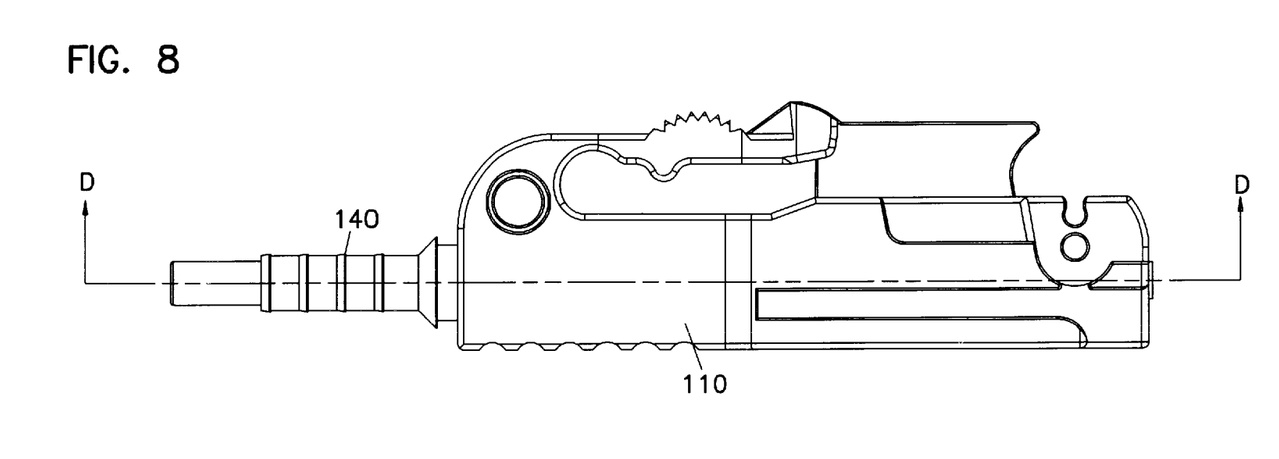
FIG. 8 is a side view of the connector of FIG. 1 in a fully assembled state with the ferrule and hub pushed back towards a rear of the connector.
Figure 9:
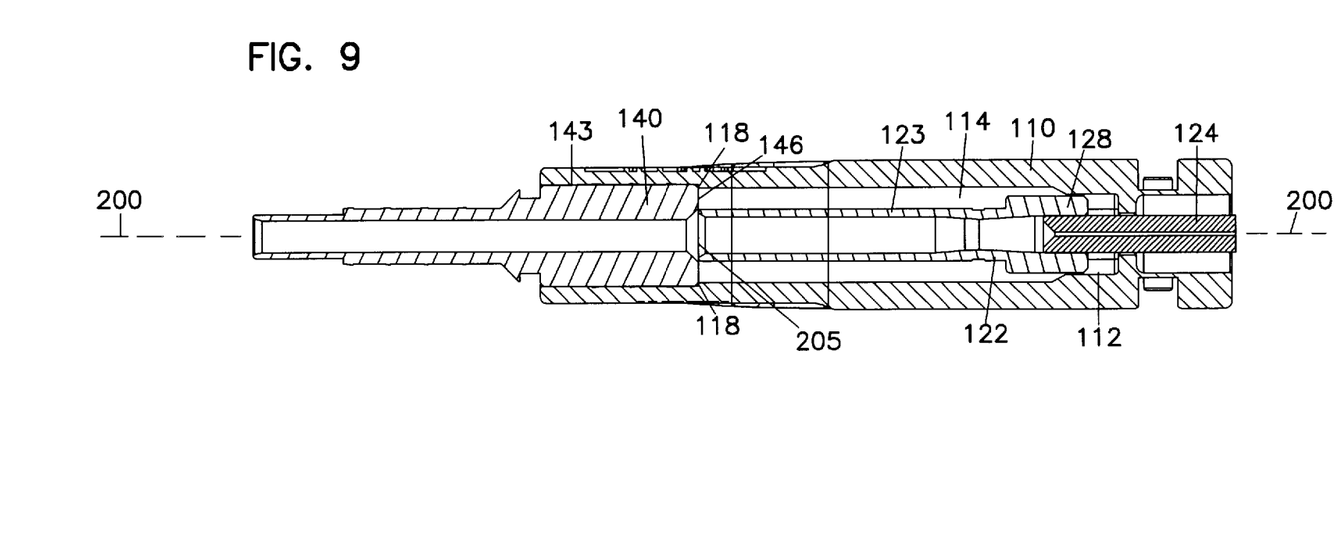
FIG. 9 is a cross-sectional view taken along line D—D of the connector shown in FIG. 8.

Therefore, in the fully assembled configuration of the connector 200 shown in FIGS. 8 and 9, neither a pushing force applied to the ferrule 124 nor a pulling force applied to the cable attached to the connector 100 and translated through the optical fiber to the ferrule 122 can cause the anti-rotation portion 128 to completely clearing the anti-rotation seat 112. This prevents rotation of the ferrule 124, thereby assuring that a fully assembled connector 100 will not become un-tuned. Resulting connector 100 is tuned with respect to the exterior structure matable with an adapter of the type in U.S. Pat. No. 6,142,676. The configuration of the connector 100 is such that it is keyed so that it can only be received in the adapter in one orientation.

The advantages embodied in connectors made in accordance to the invention are applicable to a variety of fiber optic cable and connector types. The invention is particularly convenient for smaller cables, such as, for example, 0.900- millimeter cable, which does not include strength reinforcing members. Pulling rearwardly on the cable may pull the ferrule rearwardly, against the spring, but the hub will not disengage from the housing, thereby maintaining the tuned state of the connector.

The above specification, examples and data provide a complete description of the manufacture and of the invention. Since many embodiments of the invention can be made without departing from the spirit and scope of the invention, the invention resides in the claims hereinafter appended.

What is claimed is:

1. A fiber optic connector comprising:
   an optical fiber;
   a ferrule mounted to the optical fiber;
   a hub retainably engaging the ferrule, wherein the hub includes an elongated rear portion coupled to an anti-rotation portion;
   a rear housing having an external surface and a bore for receiving the optical fiber;
   a front housing having an internal surface for receiving and engaging the external surface of the rear housing, having an anti-rotation seat configured to engage the anti-rotation portion of the hub, and defining a cavity coupled to the anti-rotation seat; and
   a spring captured between the anti-rotation portion of the hub and the rear housing to bias the anti-rotation portion of the hub into the anti-rotation seat of the front housing;
   wherein a length of the elongated rear portion of the hub is sized so that:
   (1) the anti-rotation portion of the hub can be pushed completely into the cavity and rotated to tune the connector when the rear housing is partially inserted into the front housing; and
   (2) an end of the elongated rear portion of the hub abuts the rear housing so that the anti-rotation portion of the hub cannot be completely pushed back into the cavity and rotated when the rear housing is completely engaged with the front housing.

2. The connector of claim 1, wherein the connector is sized to terminate a 0.900-millimeter fiber without reinforcing strength members.

3. A fiber optic connector comprising:
   a ferrule and hub assembly including an inner bore defining a connector axis and sized for receipt of an optical fiber, a front end defining an end face, an opposite rear end, and an anti-rotation portion disposed between the front and rear ends;
   a front housing having an anti-rotation seat engageable with the anti-rotation portion of the ferrule and hub assembly in a plurality of positions about the connector axis;
   a rear housing mountable to the front housing in a first, partially assembled position and a second, fully assembled position, the partially assembled and fully assembled positions defining different relative positions along the connector axis;
   the front and rear housings defining a chamber for receipt of the ferrule and hub assembly; and
   a spring within the chamber for biasing the ferrule and hub assembly away from the rear housing;
   wherein the ferrule and hub assembly is moveable within the chamber along the connector axis against the spring bias when the front and rear housings are in the partially assembled position so that the anti-rotation seat is disengaged from the anti-rotation portion, wherein the ferrule and hub assembly can be rotated about the connector axis relative to the front and rear housings; and
   wherein the ferrule and hub assembly, when the front and rear housings are in the fully assembled position, engages the rear housing when moved within the chamber along the connector axis, thereby preventing the anti-rotation seat from disengaging from the anti-rotation portion.

4. The connector of claim 3, wherein the connector is sized to terminate a 0.900-millimeter fiber without reinforcing strength members.

5. A fiber optic connector comprising:
   an optical fiber;
   a ferrule mounted to the optical fiber;
   a hub retainably engaging the ferrule, wherein the hub includes an elongated rear portion coupled to an anti-rotation portion;
   a rear housing having an engagement surface and a bore for receiving the optical fiber;
   a front housing having an engagement surface for receiving and engaging the engagement surface of the rear housing and having an anti-rotation seat configured to engage the anti-rotation portion of the hub; and
   a spring captured between the anti-rotation portion of the hub and the rear housing to bias the anti-rotation portion of the hub into the anti-rotation seat of the front housing;
   wherein the front and rear housings together define a cavity having a longitudinal length extending along a connector axis so that:
   (1) when the rear housing is partially inserted into the front housing, the longitudinal length of the cavity is of sufficient length to allow the anti-rotation portion of the hub to be pushed completely into the cavity and rotated to tune the connector; and
   (2) when the rear housing is fully inserted into the front housing, the longitudinal length of the cavity is not of sufficient length to allow the anti-rotation portion of the hub to be pushed completely into the cavity and rotated to tune the connector.

6. The connector of claim 5, wherein the connector is sized to terminate a 0.900-millimeter fiber without reinforcing strength members.

7. A method for tuning a fiber optic connector comprising steps of:
   providing a fiber held by a ferrule with a hub retainably engaging the ferrule, the hub including an anti-rotation portion;,
   providing a front housing including a bore with an engagement surface, an anti-rotation seat, and defining a cavity;
   providing a rear housing including a bore with an engagement surface;
   inserting the bore of the rear housing partially into the bore of the front housing;
   pushing the hub into the cavity so that the anti-rotation portion clears the anti-rotation seat of the front housing;
   rotating the ferrule and the hub to tune the connector;
   releasing the hub so that the anti-rotation portion re-engages the anti-rotation seat of the front housing; and pushing the rear housing further into the front housing until the rear and front housing are fully engaged.

8. The method of claim 7, further comprising a step of pushing the hub into the cavity until a rear portion of the hub abuts the rear housing, wherein the anti-rotation portion of the hub remains at least partially engaged in the anti-rotation seat of the front housing.

9. A method for tuning a fiber optic connector, the method comprising steps of:

provdiing a fiber held by a ferrule with a hub retainably engaging the ferrule, the hub extending for a length and including a rear end, the connector including front and rear housings engageable with one another, wherein a length of the hub is such that the rear end abuts the rear housing of the connector when the rear housing is fully engaged with the front housing and the ferrule and hub are pushed back towards the rear housing;

engaging the rear housing partially with the front housing;

pushing the ferrule back towards the rear housing;

rotating the ferrule and hub to tune the connector; and engaging the rear housing fully with the front housing, thereby preventing further rotation of the ferrule and the hub.

10. The method of claim 9, further comprising a step of pushing the ferrule and hub back towards the rear housing until the hub reaches a position wherein the rear end of the hub abuts the rear housing and wherein the hub and ferrule are prevented from rotation in this position.

11. The method of claim 9, further comprising a step of pulling the ferrule and hub towards the rear housing until the hub reaches a position wherein the rear end of the hub abuts the rear housing and wherein the hub and ferrule are prevented from rotation in this position.

12. A method for tuning a fiber optic connector, the method comprising steps of:

providing a fiber held by a ferrule with a hub retainably engaging the ferrule, the hub extending for a length and including a rear end, the connector including front and rear housings engageable with one another, wherein a length of the hub is such that the rear end abuts the rear housing of the connector when the rear housing is fully engaged with the front housing and the ferrule and hub are pushed back towards the rear housing;

inserting the rear housing partially into the front housing;

measuring alignment of the fiber in the ferrule; and pushing the rear housing further into the front housing until the rear housing completely engages the front housing and thereby prevents further rotation of the ferrule and the hub.

13. The method of claim 12, further comprising a step of pushing the ferrule and hub back towards the rear housing until the hub reaches a position wherein the rear end of the hub abuts the rear housing and wherein the hub and ferrule are prevented from rotation in this position.

14. The method of claim 12, further comprising a step of pulling the ferrule and hub towards the rear housing until the hub reaches a position wherein the rear end of the hub abuts the rear housing and wherein the hub and ferrule are prevented from rotation in this position.

* * * * *